United States Patent [19]

Thorsrud

[11] Patent Number: 4,767,799

[45] Date of Patent: Aug. 30, 1988

[54] RADIO FREQUENCY ENERGY SENSITIZED COMPOSITIONS AND METHOD FOR SENSITIZING COMPOSITIONS TO RADIO FREQUENCY ENERGY

[75] Inventor: Agmund K. Thorsrud, Bartlesville, Okla.

[73] Assignee: Phillips Petroleum Company, Bartlesville, Okla.

[21] Appl. No.: 8,815

[22] Filed: Jan. 30, 1987

Related U.S. Application Data

[62] Division of Ser. No. 707,613, Mar. 4, 1985, Pat. No. 4,661,299.

[51] Int. Cl.$^4$ ............................. C08J 3/28; C08K 3/34
[52] U.S. Cl. ................................. 523/137; 264/25; 264/26; 524/432; 524/447; 524/586
[58] Field of Search ................... 264/25, 26; 523/137; 524/432, 447, 450, 586

[56] References Cited

U.S. PATENT DOCUMENTS

| | | | |
|---|---|---|---|
| 3,108,985 | 10/1963 | Weyer | 524/450 |
| 3,487,132 | 12/1969 | Thome | 264/25 |
| 3,617,590 | 11/1971 | Neukomm | 264/37 |
| 3,848,038 | 11/1974 | Dench | 264/26 |
| 4,003,840 | 1/1977 | Ishino et al. | 252/62 |
| 4,133,797 | 1/1979 | Tirpak et al. | 524/450 |
| 4,143,109 | 3/1979 | Stockum | 264/112 |
| 4,147,911 | 4/1979 | Nishitani | 219/10.55 M |
| 4,150,514 | 4/1979 | Douglass | 51/298 |
| 4,219,361 | 8/1980 | Sutton et al. | 106/63 |
| 4,230,593 | 10/1980 | Wagner et al. | 264/25 |
| 4,234,636 | 11/1980 | Thorsrud et al. | 428/95 |
| 4,305,898 | 12/1981 | Obersby | 51/298 |
| 4,311,609 | 11/1982 | Wagner et al. | 252/179 |
| 4,360,607 | 11/1982 | Thorsrud et al. | 523/137 |
| 4,366,107 | 12/1982 | Voigt et al. | 264/25 |
| 4,375,441 | 3/1983 | Adams et al. | 264/25 |
| 4,529,750 | 7/1985 | Gimpel | 523/300 |
| 4,554,347 | 11/1985 | Hawkes | 523/300 |

FOREIGN PATENT DOCUMENTS

| | | | |
|---|---|---|---|
| 2940719 | 4/1981 | Fed. Rep. of Germany | 264/26 |
| 0046196 | 5/1974 | Japan | 523/137 |
| 0010618 | 4/1978 | Japan | 524/450 |
| 0028145 | 2/1982 | Japan | 524/450 |

OTHER PUBLICATIONS

Schindler, "Microwaves in the Extruded and Molded Rubber Goods Industry", Elastomers, May 1978, pp. 42–46.

*Primary Examiner*—Herbert J. Lilling
*Attorney, Agent, or Firm*—A. W. Umphlett

[57] ABSTRACT

A composition of enhanced radio frequency sensitivity and a method for providing enhanced radio frequency sensitivity to a composition in which a substance suitable for enhancement of radio frequency sensitivity is admixed with a radio frequency sensitizing amount of an inorganic radio frequency sensitizer treated essentially to remove absorbed water and/or other volatiles with the radio frequency sensitizer chosen from among zinc oxide (American Process), bentonite clay, and crystalline or amorphous alkali or alkaline earth metal aluminosilicate. A process for molding using these compositions and the molded product. The composition, method for enhancing radio frequency sensitivity, process for molding and molded product with a polymeric substance, particularly ultra high molecular weight polyethylene, as the substance suitable for enhancement of radio frequency sensitivity.

26 Claims, No Drawings

RADIO FREQUENCY ENERGY SENSITIZED COMPOSITIONS AND METHOD FOR SENSITIZING COMPOSITIONS TO RADIO FREQUENCY ENERGY

This application is a divisional application of application Ser. No. 707,613, filed on 03/04/85, now U.S. Pat. No. 4,661,299.

BACKGROUND OF THE INVENTION

This invention relates to the enhancement of sensitivity of compositions to radio frequency energy. In one of its aspects it relates to compositions that are transparent to radio frequency energy. In another of its aspects this invention relates to compositions that have low sensitivity to radio frequency energy. In another of its aspects this invention relates to compositions whose sensitivity to radio frequency energy has been enhanced.

It is known that sold hygroscopic fillers can be added to certain polymer compositions to provide receptivity to microwave (MW) radiation (See U.S. Pat. No. 4,234,636). It has been noted that the microwave receptivity of these polymer compositions is significantly reduced by drying the fillers before compounding with the polymers. It has, therefore, been suggested that water associated with the hygroscopic filler is responsible for the MW receptivity.

It is also known that polar organic compounds can be admixed with particulate inorganic materials such as silicas to provide MW sensitizing compositions suitable for blending with polymers to provide MW receptivity to the resulting polymer compositions (See U.S. Pat. No. 4,360,607).

It has now been found that certain inorganic compounds can provide radio frequency (RF) radiation receptivity to a wide variety of compositions, especially polymers, after these inorganic compounds have been essentially dried and in the absence of added polar organic compounds. This invention, therefore, provides many opportunities to utilize RF radiation for heating of compositions containing these certain inorganic compounds so that a multiplicity of products, such as molded objects, can be produced for a multiplicity of purposes.

It is, therefore, an object of this invention to provide a method for enhancing the radio frequency sensitivity of compounds to which the process is applicable. It is another object of this invention to provide compositions of enhanced radio frequency sensitivity. It is still another object of this invention to provide compositions containing certain inorganic compounds so that these compositions have enhanced radio frequency sensitivity as compared to the compositions without these inorganic compounds. It is still another object of this invention to produce molded objects by subjecting compositions of enhanced radio frequency sensitivity to radio frequency energy in a molding operation such as transfer, injection or compression molding. It is still another object of this invention to enhance the radio frequency sensitivity of suitable polymeric materials, particularly ultra high molecular weight polyethylene.

Other aspects, objects and the various advantages of this invention will become apparent upon reading this specification and the appended claims.

STATEMENT OF THE INVENTION

In accordance with this invention there are provided compositions in which there is a substance suitable for enhancement of radio frequency sensitivity and a radio frequency sensitizing amount of an inorganic radio frequency sensitizer treated essentially to remove absorbed water and/or other volatiles said sensitizer chosen from the group consisting of (1) zinc oxide (American Process), (2) bentonite clay, and (3) crystalline or amorphous alkali or alkaline earth metal aluminosilicate.

In an embodiment of the invention a method is provided for enhancing the radio frequency sensitivity of a substance suitable for such enhancement in which there is admixed with the substance suitable for radio frequency enhancement a radio frequency sensitizing amount of an inorganic radio frequency sensitizer treated essentially to remove absorbed water and/or other volatiles with a sensitizer chosen from the group consisting of (1) zinc oxide (American Process), (2) bentonite clay, and (3) crystalline or amorphous alkali or alkaline earth metal aluminosilicate.

In another embodiment of the invention compositions in accordance with the radio frequency enhancement of this invention are subjected to radio frequency energy in a process for producing molded objects.

The suitable inorganic RF sensitizers employed in the instant invention are selected from the group consisting of: zinc oxide (American Process), bentonite clay, and crystalline or amorphous alkali or alkaline earth metal aluminosilicates.

"American process" zinc oxide is a well known commercially available material. As distinguished from the "French process" material, the "American process" zinc oxide is obtained by roasting of a suitable zinc ore whereas the "French process" employs an oxidation of vaporized zinc metal. An example of a suitable zinc oxide is AZO-55 from American Smelting and Refining Co. Columbus, Ohio with typical properties as shown below:

| TECHNICAL VALUES (Average) | |
|---|---|
| Physical Properties | |
| Specific Gravity | 5.6 |
| One Pound Bulks Gallons | 0.0214 |
| Apparent Density (Lbs./cu. ft.) | 32 |
| Particle Diameter (Microns) | 0.27 |
| Surface Area (Sq.m./gm.) | 4.00 |
| Rub-out Oil Absorption | 14 |
| Fineness thru 325 Mesh (%) | 99.95 |
| Chemical Analysis | |
| Zinc Oxide (ZnO) | 99.20% |
| Lead (Pb) | 0.02% |
| Cadmium (Cd) | 0.05% |
| Sulfur (S) | 0.03% |
| $H_2O$ Soluble Salts | 0.30% |
| Insoluble in HCl | 0.15% |
| Loss at 105° C. | 0.10% |

Bentonite clay, particularly the "Western type", is disclosed in U.S. Pat. No. 4,234,636 as a hygroscopic filler in the prior art process noted. However, bentonite clay, especially the Western type, is also suitable in the instant invention after a heating step to drive off absorbed water. Bentonite clay is a naturally occurring material containing appreciable amounts of the clay mineral montmorillonite, (Mg, Ca) $O.Al_2O_3.5SiO_2.nH_2O$. As noted above bentonite clay obtained from the Western states of the USA is preferred for use in the instant invention. A particularly useful Western bentonite material is Nygel-5 from Industrial Minerals Ventures, Inc. Lathrop Wells, Nev.

The alkali or alkaline earth metal aluminosilicates are a preferred group of RF sensitizers according to this invention. These materials can be either amorphous or crystalline in nature and can be obtained by synthetic methods. The alkali metal ion can be lithium, sodium, or potassium preferably sodium, while the alkaline earth metal ion can be magnesium or calcium, usually calcium. It is also possible for combinations of the above ions to be present in the aluminosilicates such as sodium and calcium. Suitable amorphous aluminosilicates are exemplified by the commercially available Zeolex 23, Zeolex 7-UD, or Zeolex 7A from J. M. Huber Corp. Havre de Grace, MD. The suitable crystalline aluminosilicates encompass the well known crystalline zeolites which are crystalline compounds composed of tetrahedrons of silicon oxide in which aluminum atoms have replaced some of the silicon. The zeolites are well known for their ion exchange behavior and molecular sieve character. Suitable synthetic crystalline zeolites include those within the families of Type A, Type D, Type L, Type R, Type S, Type T, Type X, Type Y and Type ZSM-5. More specific examples include Types 3A, 4A, 5A, 10X, 13X, ZSM-8 and ZSM-11.

The average particle size (diameter) of the inorganic RF sensitizers of this invention is generally within the range of about 0.25 micron to about 15 microns, preferably from about 0.5 microns to about 7 microns. The surface area (BET method) can range from about 1 $m^2/g$ to about 1,000 $m^2/g$, preferably from about 200 $m^2/g$ to about 500 $m^2/g$. For best results, if a material with low surface area is chosen the particle size should be as small as practicable. Conversely, if a material of large particle size is chosen the surface area should be as high as practicable. In some instances it may be desirable to subject the material to a preliminary size reduction step to improve its effectiveness as an RF sensitizer in the application under consideration. This also may be especially helpful when the RF sensitizers of this invention are intended for use in polymer compositions. It is generally true that the physical properties of polymer are least affected when the particle size of the added material is at the smallest end of the range. Size reduction can be accomplished by conventional methods such as grinding, ball milling and the like.

As noted above the inorganic RF sensitizers of the instant invention are subjected to a preliminary treating step which effectively removes adsorbed water and/or other volatiles which might be present. The conditions employed in the treating step can vary widely depending on the amount of adsorbed water and/or other volatiles present among other considerations. Usually heating to a constant weight will be adequate to provide an inorganic RF sensitizer of this invention free of adsorbed water and/or other volatiles. Generally, the temperature can range from about 100° C. to about 300° C. while the time can range from about 0.5 hour to about 72 hours in the heating step of this invention. The heating can be carried out at atmospheric pressure and in a flowing gas such as air, nitrogen, argon or helium if desired. The heating also can be conducted under reduced pressure such as achieved by conventional vacuum pumps.

The inorganic RF sensitizers of this invention which have been treated as described above can be mixed with the material to be subjected to RF radiation in a variety of conventional methods.

For polymer compositions it is practically effective and preferred to dry blend the inorganic RF sensitizer with solid polymer particles which may contain other conventional additives such as antioxidants, pigments, fillers and the like. The polymer particles will preferably have an average particle size of from about 10 mesh to about 40 mesh though smaller of larger particles can be employed if desired. It is also possible to use a melt blending operation to incorporate the inorganic RF sensitizer into a polymer composition such as by employing a mixing extruder. The RF sensitizer can be added before, after, or during addition of other polymer additives in the mixing extruder operation.

It is also possible to prepare a dispersion of a finely divided inorganic RF sensitizer in a liquid which is essentially inert to RF radiation e.g. alkanes having 5-30 carbon atoms, and then contacting the material to be made RF sensitive with said dispersion as by spraying, milling, tumbling or stirring without or with subsequent removal of the dispersion vehicle such as by vacuum assisted evaporation.

For RF transparent polymers the amount of inorganic RF sensitizer employed according to this invention can be broadly from about 1 wt. % to about 20 wt. % based on the weight of the total composition. Preferably, the amount will range from about 4 wt % to about 6 wt. % on the same basis as above. These ranges are also particularly suited to RF equipment of about 1 kW power at 100 MHz frequency. For RF equipment of higher power and frequency it would be expected that the amounts of RF sensitizer can be reduced.

Furthermore, if the polymer employed has some RF responsiveness then the amount of RF sensitizer can also be reduced since the RF absorption effects of polymer and sensitizer are additive.

In the USA the Federal Communications Commission (FCC) has designated certain radio frequency bands centered about 50 MHz, 915 MHz, 2450 MHz, 5800 MHz and 22000 MHz for industrial heating units to minimize conflict with communication systems. The compositions which are RF sensitized according to the instant invention can be treated with electromagnetic radiation of preferably from about 1 MHz to about 2500 MHz, more preferably from about 20 MHz to about 1000 MHz.

Several manufacturers provide equipment suitable for generating the RF radiation within the needed ranges. An example is Thermall #9 Electronic Heating Equipment with 1.25 kW power at 100 MHz made by W. T. LaRose & Associated Troy, NY.

Power absorption is governed by the equation $P = 1.41 (E/D)^2 \times f \times E''$ where P is in watt/in$^3$, E is the electrode voltage in kV, D is the electrode distance in inches, f is frequency in MHz and $E''$ is the dielectric loss factor which is the product of the dielectric constant, $E'$, and dissipation factor, $\tan \Delta$. This equation is well known to those skilled in the art of RF or MW heating and can be used to adjust available equipment to the compositions being treated with RF energy.

Broadly speaking, the inorganic RF sensitizers of the instant invention are useful in essentially any composition wherein the inorganic compound is not materially detrimental and which is to be subjected to RF radiation for heating purposes. Thus, the inorganic RF sensitizers of this invention provide opportunities to use RF radiation for heating in a multitude of applications.

One area of application that is especially important involves polymer processing. In operations such as injection molding, transfer molding, blow molding, vacuum forming, extrusion, softening, foaming, shaping, curing and the like the RF sensitized polymer compositions can be subjected to RF radiation to efficiently provide the needed heat to accomplish the desired operation. The inorganic RF sensitizers can be used in presence of other polymer compounding ingredients such as carbon black which are also RF sensitive to some extent to enhance the level of RF sensitivity of the composition. This enhancement can also be obtained with the use of the inventive inorganic RF sensitizers in certain polar polymers which are in themselves RF sensitive. One particular area within the field of polymer processing that is especially aided by the inorganic RF sensitizers of this invention is that of handling ultra high molecular weight polyethylene (UHMWPE). It is recognized that this material has many desirable properties but the ultra high molecular weight which is apparently responsible for the desirable properties also makes this material extremely difficult to process. RF heating has been utilized with carbon black as the RF sensitizer but this has not been entirely satisfactory especially if articles having color other than black are desired. According to the instant invention the UHMWPE material can be intensively mixed with an inorganic RF sensitizer of this invention and then subjected to RF radiation during the molding, e.g. transfer, injection, or compression molding, of various articles therefrom.

The following are processes and compositions suitable in processes illustrative of the present invention. These examples should be taken as illustrative and should not be considered to be restrictive.

EXAMPLE I

A large number of inorganic powders was tested for RF responsiveness before and after drying (heating) at 138° C. (280° F.) for 18 hours. The tests were conducted by placing a weighed portion of the inorganic powder in a Teflon dish sample holder of 3 3/32 inch cavity diameter and ¼ inch deep which could be covered with a ¼ inch thick Teflon lid. The sample holder was placed between 6 inch×6 inch electrode platens set 1½ inches apart in a Thermall #9, 1.25 kW, 100 MHz heater made by W. T. LaRose and Associates Troy, NY. Each sample was exposed to the RF radiation for the indicated time while the current flow in milliamperes (mA) and temperature reached (° F.) by the sample were noted. The background or "no-load" current reading was 167 mA. Temperature measurement was obtained with a needle pyrometer inserted into the sample at several points and the highest reading recorded. Temperatures greater than about 600° F. were estimated. Table Ia presents results obtained for a number of inorganic powders which after drying were rated as "nonresponsive" to "fair" response. Table Ib presents results for certain amine treated or silane treated clays which were rated as having "moderate" response after drying. It should be noted that the clay treating agents such as amino compounds would be expected to add polarity to the clays and thus provide some degree of RF sensitivity. The materials in Tables Ia and Ib are thus outside the scope of the instant invention. Table Ic presents results on inorganic powders which after drying show "Good" to "Excellent" RF response and these illustrate the RF sensitizers of the instant invention.

It is surprising that the American process zinc oxide was "very good" in RF response (Table Ic) after drying while the French process zinc oxide is essentially "nonresponsive" even before drying. In addition, it is surprising that the other materials in Table Ic where "good" to "excellent" in RF response after drying.

TABLE Ia

Results of RF-Response of Various Inorganic Powders
None - Fair Response

| Material | Amount Grams | Exposure, Seconds | Not Dried mA | Not Dried °F. | Dried mA | Dried °F. | Observations |
|---|---|---|---|---|---|---|---|
| Precipitated Hydrated Silicas | | | | | | | |
| Hi Sil 233 (PPG) | 25 | 30 | 50–30 | 250 | 2–7 | 185 | Condens$^a$ both cases |
| Silene D (PPG) | 15 | 30 | 35–46 | 275 | 5–10 | 231 | Condens$^a$ both cases |
| Sipernat 22 (Degussa) | 17 | 30 | 35–34 | 262 | 2–12 | 215 | Condens$^a$ both cases |
| Other Silicas | | | | | | | |
| Syloid 74 Silica gel (Davison) | 25 | 30 | 15–12 | 165 | 8–11 | 196 | |
| Syloid 308, hydrophobized silica gel | 25 | 30 | 20–15 | 183 | 0–6 | 148 | |
| Imsil A-108 (Ind. Min. Sil) | 25 | 30 | 10–13 | 147 | 3–7 | 130 | |
| Carbonates | | | | | | | |
| Altowhite UF, CaCO$_3$ (Georgia Marble) | 25 | 30 | 0–6 | 105 | 0–3 | 130 | |
| Magcarb L, MgCO$_3$ (C.P. Hall) | 12.5 | 30 | 145–65 | 360 | 25–47 | 380 | Fair Response |
| ZnCO$_3$ | 25 | 30 | 180–45 | 345 | 0–6 | 180 | |
| Talc, Mica | | | | | | | |
| Emtal 549 (C.P. Hall) | 25 | 30 | 2–8 | 115 | 0–3 | 155 | |
| Mica P-12 (C.P. Hall) | 25 | 30 | 40–32 | 280 | 11–22 | 150 | |
| Calcinated Clays | | | | | | | |
| Polyfil 70 (J.M. Huber) | 25 | 30 | 0–7 | 130 | 0–4 | 160 | |
| Hydrated Clays | | | | | | | |
| B-80 (Thiele) | 25 | 30 | 200–47 | 420 | 30–75 | 425 | Condens$^a$ both cases |
| Barden-R (J.M. Huber) | 25 | 30 | 170–42 | 405 | 45–35 | 230 | Condens$^a$ undried |
| Champion Clay (Harwick) | 25 | 30 | 160–37 | 440 | 16–26 | 215 | Condens$^a$ undried |
| Hydrite UF (Georgia Kaolin) | 25 | 30 | 102–39 | 390 | 0–6 | 160 | Condens$^a$ undried |
| Oxides, Etc. | | | | | | | |
| Aluminum oxide P (Degussa) | 7.5 | 30 | 235–37 | 240 | 20–25 | 280 | Condens$^a$ undried Fair Response |
| Hydrated alumina | 25 | 30 | 10–18 | 130 | 6–11 | 122 | |

TABLE Ia-continued

Results of RF-Response of Various Inorganic Powders
None - Fair Response

| Material | Amount Grams | Exposure, Seconds | Not Dried mA | °F. | Dried mA | °F. | Observations |
|---|---|---|---|---|---|---|---|
| MAF Magnesium Oxide | 25 | 30 | 4–11 | 110 | 3–8 | 85 | |
| Titanium oxide P-25 (Degussa) | 10 | 30 | 30–25 | 200 | 3–10 | 175 | |
| Titanium oxide OR-450 (DuPont) | 25 | 30 | 8–15 | 145 | 3–7 | 205 | |
| French Proc. ZnO Pasco 558 | 27 | 30 | 10–15 | 115 | — | — | Not tested dried |
| Lithopone | 25 | 30 | 10–18 | 130 | 6–11 | 122 | |
| Hydrated lime | 25 | 30 | 50–35 | 285 | 5–10 | 120 | Condens$^a$ undried |
| Magnesium hydroxide | 25 | 30 | 55–40 | 322 | — | — | Decomposed when dried |
| Diatomaceous Earth, Fullers Earth, Etc. | | | | | | | |
| Diacalite 103 (Gretco) | 12.5 | 30 | 105–50 | 468 | 12–17 | 225 | Condens$^a$ undried |
| Celite Silver Frost (Johns-Manville) | 12.5 | 30 | 50–40 | 325 | 14–17 | 175 | Condens$^a$ undried |
| Fullers Earth | 25 | 30 | 165–73 | 500 | 5–10 | 160 | Condens$^a$ undried |
| Felex 100, Feldspar (Feldspar) | 25 | 30 | 10–14 | 150 | 1–7 | 142 | |

TABLE Ib

Results of RF-Response of Various Inorganic Powders
Moderate Response

| Material Treated Clays | Amount Grams | Exposure Seconds | Not Dried mA | °F. | Dried mA | °F. | Observations | RF-Resp. |
|---|---|---|---|---|---|---|---|---|
| Nucap 190, Mercaptosilane (J.M. Huber) | 25 | 30 | 305–60 | 560 | 20–62 | 375 | Condens$^a$ undried | Mod. − |
| Nulok 390, Aminosilane (J.M. Huber) | 25 | 30 | 200–62 | 550 | 20–42 | 330 | Condens$^a$ undried | Mod. − |
| Imvitone II Amine Bent. Clay (Ind. Min. Vent.) | 25 | 30 | 135–285 5 sec. | 480 | 5–205 | 480 | Condens$^a$ undried Smoke evolution, charring | Mod. + |

TABLE Ic

Results of RF-Response of Inorganic Powders
Good-Excellent Response

| Material | Amount Grams | Exposure Seconds | Not Dried mA | °F. | Dried mA | °F. | Observations | RF-Resp. |
|---|---|---|---|---|---|---|---|---|
| Oxides | | | | | | | | |
| Am. Proc. Zinc oxide, B (Smith C&C) | 25 | 10 | 50–41 | 305 | 50–41 | 1100 (Est.) | GLOW$^b$ when dried | V. good |
| Amorphous Sodium Aluminum Silicates | | | | | | | | |
| Zeolex 7UD (J.M. Huber) | 12.5 | 10 | 215–205 | 1100 Est. | 20–195 | 1100 Est. | GLOW$^b$ in both cases | Exc. |
| Zeolex 23 (J.M. Huber) | 10 | 10 | 175–175 | 1100 Est. | 25–180 | 1100 Est. | GLOW$^b$ in both cases | Exc. |
| Zeolite Crystalline Sodium Aluminum Silicates | | | | | | | | |
| Zeolite 4A, Detergent grade (Union Carb.) | 12.5 | 35 | 265–255 | 1100 Est. | 135–215 10 sec. | 1100 Est. | Condens$^a$ in both cases. GLOW$^b$ in both cases | Exc. |
| Bentonite Clays | | | | | | | | |
| Nygel (Ind. Min. Ventures) | 25 | 30 | 130–195 | 800 Est. | 70–167 | 1100 Est. | Condens$^a$ undried GLOW$^b$ when dried | V. good |
| Rheospan (Am. Colloid) | 25 | 30 | 220–120 | 700 Est. | 45–101 | 900 Est. | Condens$^a$ undried | Good |
| HPM-20 (Am. Colloid) | 25 | 30 | 150–120 | 575 | 65–110 | 1000 Est. | Slight condens$^a$ undried. Condens$^a$ undried. | Good |
| 325 Mesh (H.M. Royal) | 25 | 30 | 85–98 | 390 | 60–80 | 800 Est. | Flames, Charring | Good |

$^a$Condensate observed on RH exposure
$^b$Material glowed on RH exposure

EXAMPLE II

Other tests were conducted with the same apparatus employed in Example I in which amorphous sodium aluminum silicates (Table Ic, Example I) were admixed with several RF transparent polymers to provide polymer compositions with RF sensitivity. The results shown in Table II below clearly demonstrate the effectiveness of the dried amorphous sodium aluminum silicates in providing RF sensitivity to otherwise RF transparent polymers.

TABLE II

| Run No. | Polymer | Wt. % Zeolex | Sample wt, g | Exposure, sec | Current, mA | Temp. °F. | Observation |
|---|---|---|---|---|---|---|---|
| 1 | A[a] | 0 | 30 | 60 | 0-5 | 85 | — |
| 2 | A | 5[e] | 30 | 60 | 55-58 | 500 | melted |
| 3 | B[b] | 0 | 12.5 | 30 | 0-5 | 85 | — |
| 4 | B | 8[d] | 12.5 | 30 | 35-40 | 580 | melted |
| 5 | C[c] | 0 | 25 | 30 | 3-4 | 85 | — |
| 6 | C | 10[d] | 25 | 60 | 35-38 | 600+ | melted |

[a]Polystyrene pellets.
[b]Poly(phenylene sulfide) (PPS), Ryton ® powder type from Phillips Petroleum Co. having a melt flow of 850 ± 10 g/10 min as determined according to ASTM D 1238, Procedure B modified to use 5 kg weight 600° F. (316° C.)and 0.17 mm orifice.
[c]Poly(tetrafluoroethylene), Teflon ® polymer from E.I. duPont Co. ground to a powder.
[d]Zeolex 23 from J.M. Huber Corp.
[e]Zeolex 7 from J.M. Huber Corp.

EXAMPLE III

Tests were conducted which examined the effect of added amorphous sodium aluminum silicate on the microwave curing of a rubber composition containing carbon black. The compounding recipe is shown below.

| Recipe | Parts, by wt |
|---|---|
| Rubber[a] | 100 |
| Oil and stabilizers | 11.5 |
| Sulfur | 0.5 |
| Zinc dimethyldithiocarbamate | 3 |
| Zinc dibutyldithiocarbamate | 3 |
| Carbon black, N-330 | 65 |
| Carbon black, N-550 | 30 |
| Calcium oxide in oil | 10 |
| 4,4'-Dithiodimorpholine | 2 |
| Sodium Aluminum silicate[b] | 0 or 9 |

[a]Oil extended (50 phr oil) ethylene/propylene/diene monomer (EPDM) rubber.
[b]Zeolex 23 from J. M. Huber Corp.

The compounds were mixed then fed in a continuous manner to a vacuum extruder and the extrudate fed to a microwave curing oven (10 KW Despatch oven made by Despatch Oven Co.) with surrounding air kept at 500° F. to prevent heat loss then to a hot air oven with 500° F. hot air then through a water bath for cooling before take off on a turntable. At an extrudate cross section of about 0.4 square inch the results shown below were obtained.

| | Run IIIa (Control) | Run IIIb (Invention) |
|---|---|---|
| Zeolex 23, phr | 0 | 9 |
| Linear speed, ft/min | 20 | 27 |
| Microwave power setting, KW | 8 | 4 |

At an extrudate cross section of about 0.1 square inch the invention compound gave blistered product which indicated excessive temperature during curing which in turn indicated that 9 phr of the amorphous sodium aluminum silicate was too much for the conditions used. However, the results shown above for the thicker extrudate demonstrate a strong microwave cure promoting effect for the Zeolex 23 additive. This is seen by increased oven throughput and a reduced microwave power output requirement. It should also be noted that the cure promoting effect was evident even though large amounts of carbon black were present in the compound. Carbon blacks are known to promote microwave responsiveness in rubber compositions.

EXAMPLE IV

The RF responsiveness of both amorphous and crystalline sodium aluminum silicates according to this invention was utilized to prepare sintered polymer compositions useful as filters and the like. These compositions are especially useful when made from ultrahigh molecular weight polyethylene (UHMWPE) because the resulting sintered polymer compositions have excellent strength properties even though they are porous.

In these tests the polymer powder (Hercules UHMWPE 1900 IV 22 or 27) and RF sensitizing additive were ballmilled for 45 minutes in a glass jar with steel balls. The resulting mixture (about 18 g) was placed in the Teflon sample holder of the RF heating apparatus described in Example I which served as the mold. In these runs the electrode platen distance was 1 5/8 inch. Each mixture was subjected to very light mold pressure of 5.5 g/cm² (none in Run 7 of Table IVa) during the RF radiation treatment. The results obtained in these runs are presented in Table IVa and IVb below. The runs in Table IVa were made with an amorphous sodium aluminum silicate, Zeolex 7 UD from J. M. Huber Corp. as the RF sensitizer while the runs in Table IVb were made with a crystalline sodium aluminum silicate, Arogen 3001 also from J. M. Huber Corp. as the RF sensitizer. Except as indicated for Runs 8 and 11-13 of Table IVb the mold was exposed to RF radiation at ambient temperature i.e. no mold preheating.

TABLE IVa

| | Hercules UHMWPE 1900 IV 22 | | | | |
|---|---|---|---|---|---|
| Run No. | Sensitizer, php | Exposure time, sec | Max-Min mA | Calculated % Porosity[b] | Observations |
| 1 | 5 | 240 | 35-35 | — | Much loose powder |
| 2 | 5 | 330 | 40-35 | — | Some loose powder, marginal. |
| 3 | 10 | 120 | 60-40 | 49 | Good, but some loose powder on surface. |
| 4 | 15 | 90 | 68-65 | 41 | Very good. No loose powder. |
| 5 | 20 | 90 | 70-65 | 42 | Very good. No loose |

TABLE IVa-continued

| | Hercules UHMWPE 1900 IV 22 | | | | |
|---|---|---|---|---|---|
| Run No. | Sensitizer, php | Exposure time, sec | Max-Min mA | Calculated % Porosity[b] | Observations |
| | | | | | powder. |
| 6 | 25 | 70 | 100-90 | 48 | Fair. Loose powder on surface. |
| 7[a] | 20 | 90 | 68-62 | 43 | Fair. Some loose powder on surface |

[a] No pressure applied to mold.
[b] Ratio of product specific gravity over polymer specific gravity × 100.

TABLE IVb

| | Hercules UHMWPE 1900 IV 22[a] | | | | |
|---|---|---|---|---|---|
| Run No. | Sensitizer, php | Exposure time, sec | Max-Min mA | Calculated % Porosity[b] | Observation |
| 1 | 5 | 180 | 42-42 | 49 | Good, but some loose powder on surface |
| 2 | 5 | 240 | 43-43 | 47 | Excellent |
| 3 | 10 | 120 | 90-70 | 50 | Excellent |
| 4 | 15 | 90 | 112-105 | 52 | Excellent |
| 5 | 20 | 60 | 150-140 | 50 | Very good |
| 6 | 25 | 20 | 200- | 50 | Poor, much loose powder on surface |
| 7 | 10[b] | 90 | 96-47 | 51 | Excellent |
| 8[c] | 10[b] | 60 | 100-50 | 54 | Excellent |
| 9[a] | 10 | 120 | 90-72 | 51 | Excellent |
| 10[a] | 10[d] | 120 | 90-70 | Poor, not sintered | |
| 11[c] | 15 | 60 | 135-125 | 50 | Excellent |
| 12[c] | 15 | 30 | 135-125 | 49 | Very good |
| 13[c] | 15[e] | 45 | 137-72 | 51 | Excellent |

[a] Runs 9 and 10 employed IV 27 type polymer.
[b] Added 1 php of N—ethyl-o and p-toluene-sulfonamide.
[c] Mold temperature increased to 320° F. before RF exposure.
[d] Added 1 php of glycerine.
[e] Added 2 php of an azodicarbonamide blowing agent (Porofor ADC/M from Mobay Chemicals) and 0.5 php of American process type zinc oxide.

The results in Tables IVa and IVb above show that sintered polymer compositions of suitable porosity and strength for use as filters can be readily made from UHMWPE and amorphous or crystalline sodium aluminum silicates employing RF heating. It was further shown that such filter materials have a very high absorption capacity for ordinary tobacco smoke in that 20 mouthfuls of cigarette smoke blown through the same filter area left only a small depth discolored.

It can also be seen that at about 25 php of inorganic RF sensitizer there is interference with sintering of the UHMWPE polymer particles. In these tests about 10-15 php of sensitizer seemed to give best results.

Comparision of Runs 7 and 8 and Runs 4 and 11 of Table IVb show that preheating the mold to about 300°-350° F. can reduce RF exposure time and improve surface sintering.

There is also indication that calculated porosity of the material can be controlled by mold pressure, sensitizer level, exposure time and polymer particle size. Porosity appears to reach a maximum just before polymer starts to melt and mechanical strength also appears to peak near this same point. This point is observed when the current just starts to increase from a minimum after first having passed a maximum.

It is also seen that organic additives (Run 10 Table IVb), even in small amounts, seem to interfere with the sintering though Runs 7 and 8 of Table IVb show an exception to this effect.

It was also found that the RF sintering of polycarbonate or poly(phenylene sulfide) polymer powders to form porous materials was not successful because the samples melted. It is believed that the sharp melting points of these polymers was responsible for this behavior.

EXAMPLE V

The effect of preheating conditions on the RF sensitivity of various inorganic materials was examined. These tests were conducted in the apparatus previously described in Example I. These tests measured weight (moisture) loss as well as RF responsiveness of the inorganic material after the preheating treatment. The results are presented in Table V below. In each test about 18 g of sample was employed for a 2 minute preheat at the indicated temperature.

TABLE V

| Run No. | Inorganic Material[a] | Moisture Loss, Wt % | Time sec/to Reach Temp °F. |
|---|---|---|---|
| 1 | A | 7.1 | 310/600°+ |
| 2 | B | 1.9 | 240/250°[b] |
| 3 | C | 9.6 | 150/Glow[b] |
| 4 | D | 12.2 | 28/Glow[b] |
| 5 | E | 13.9 | 70/Glow[b] |
| 6 | F | 0 | 50/Glow[b] |
| 7 | G | 11. | 7/450° |
| | | | 400° C. Preheat |
| 8 | A | 9.1 | 360/400° |
| 9 | B | 31.8 | 240/400° |
| 10 | C | 11.8 | 130/Glow[b] |
| 11 | D | 21.1 | 40/Glow[b] |
| 12 | E | 15.6 | 67/Glow[b] |
| 13 | F | 0 | 40/Glow[b] |
| 14 | G | 20.4 | 30/Glow[b] |
| | | | 600° C. Preheat |
| 15 | A | 9.9 | 360/270° |
| 16 | B | — | |
| 17 | C | 16.8 | 500/Glow[b] |

TABLE V-continued

| Run No. | Inorganic Material[a] | Moisture Loss, Wt % | Time sec/to Reach Temp °F. |
|---|---|---|---|
| 18 | D | 22.2 | 40/Glow[b] |
| 19 | E | 16.3 | 58/Glow[b] |
| 20 | F | 0 | 30/Glow[b] |
| 21 | G | 21.8 | 60/Glow[b] |

[a]A is a precipitated hydrated amorphous silica, Hi Sil 233.
B is a hydrated alumina, Hydral 705.
C is a Western bentonite clay, Nygel.
D is a crystalline sodium aluminum silicate (zeolite), Arogen 3001.
E is an amorphous sodium aluminum silicate, Zeolex 7 UD.
F is an American process zinc oxide, Type B, lead free.
G is a crystalline sodium aluminum silicate, Zeolite ZLD 1000.
[b]Material glowed on exposure to RF energy.

It is seen from Table V that RF responsiveness actually increased for materials B, E and F after preheating at 200°, 400° and 600° C. while material A decreased in RF responsiveness as the preheat temperature increased, apparently due to increasing moisture loss. Material C and G first showed an increase in RF responsiveness on increasing preheat temperature from 200° to 400° C. but then decreased in RF responsiveness as the temperature was raised from 400° to 600° C. This decrease may have been due to a collapse of crystalline structure in these materials at about 500° C. Material D appeared relatively insensitive to preheat temperature in terms of RF responsiveness even though significant moisture loss occurred at each temperature which indicates that the RF responsiveness of this material was not significantly dependent on its water content.

EXAMPLE VI

Tests were conducted using the RF heating apparatus described in Example I at 1.5 inch electrode distance to examine the effect of polymer particle size on RF responsiveness of polymer particles (20 g) admixed (ball-milled 30 minutes) with 5 php of crystalline sodium aluminum silicate, Arogen 3001, Type 4A zeolite, particle size >1 micron, surface area >200 m$^2$/g (BET-method) from J. M. Huber Corp. (The zeolite was not preheated.) Exposure time in each run was 45 seconds and the recorded temperature was obtained by use of a needle pyrometer. The results obtained in these runs are presented below in Table VI.

TABLE VI

| Run No. | Particle size (mesh) | ΔmAmp | °F. |
|---|---|---|---|
| A. Poly(phenylene Sulfide)[a] | | | |
| 1 | >12 | 18-35 | 360 |
| 2 | 12 < 20 | 20-36 | 395 |
| 3 | 20 < 40 | 20-34 | 345 |
| 4 | 40 < 50 | 20-32 | 315 |
| 5 | <50 | 19-29 | 283 |
| 6 | Unfractionated | 20-33 | 340 |
| B. High MW HD Polyethylene[b] | | | |
| 7 | >20 | 17-32 | 220 |
| 8 | 20 < 40 | 17-32 | 210 |
| 9 | 40 < 50 | 16-30 | 192 |
| 10 | <50 | 16-30 | 189 |
| 11 | Unfractionated | 18-31 | 200 |
| C. Ultrahigh MW Polyethylene[c] | | | |
| 12 | >50 | 17-37 | 267 |
| 13 | <50 | 18-36 | 264 |

[a]Ryton ® MR-03
[b]Marlex ® HXM 50100
[c]Hercules 1900 IV 22

As seen in Table VI above the larger polymer particles appear to be more responsive to RF heating. This may be due to a greater concentration of RF sensitizer on the surface of said particles causing greater energy absorption on the surface of the larger particles. If surface overheating is expected to be very detrimental then it will be preferable to use a smaller particle size for the polymer and with a narrow particle size distribution if possible. If coarser polymer particles have to be used it would be preferable that they be mixed with smaller polymer particles if possible.

EXAMPLE VII

Other tests were conducted with crystalline or amorphous sodium aluminum silicates of various particle sizes used as RF sensitizers in ultrahigh molecular weight polyethylene (hercules UHMWPE 1900, IV 22 powder). All of the sodium aluminum silicates were supplied by J. M. Huber Corp. The tests were made using the RF equipment previously described in Example I.

In each test 50 g of UHMWPE powder was ball milled for 30 min. with 2.5 g of the sodium aluminum silicate. A 20 g portion of the blend was placed in the sample holder cavity taking care that the bed thickness was uniform. The lid was placed on top of the sample holder and the material exposed to RF cross-field at an electrode distance of 1.5 inch for 30 and 60 seconds. As before, the temperature was measured with a needle pyrometer. The ΔmAmp value is the difference between the actual mAmp reading with sample in place and the mAmp reading for RF exposure of the empty sample holder. The sample holder was cooled to room temperature before each test was run.

The results obtained in these tests are presented in Table VII below.

TABLE VII

| Run No. | NaAl Silicate[a] | Ave. Particle Size, microns | BET Surface Area, m$^2$/g | Wt. loss % | RF Exposure Time | | | |
|---|---|---|---|---|---|---|---|---|
| | | | | | 30 sec. | | 60 sec. | |
| | | | | | ΔmAmp | °F. | ΔmAmp | °F. |
| 1 | A-1 | 5-7 | 180-225 | 6[b] | 17-37 | 241 | 17-37 | 283 |
| 2 | A-2 | 5-7 | 100-130 | 8[b] | 11-31 | 213 | 11-31 | 273 |
| 3 | A-3 | 5-7 | 60-80 | 3.5-5.5[b] | 8-15 | 140 | 8-15 | 165 |
| 4 | A-4 | 5-7 | 30-40 | 7[b] | 5-12 | 121 | 5-12 | 139 |
| 5 | A-5 | 7.6 | 23 | 15.4[c] | 3-8 | 101 | 3-8 | 111 |
| 6 | A-6 | 4.9 | 23 | 15.4[c] | 3-13 | 109 | 3-13 | 119 |
| 7 | C-7 | 3.7 | 3 | 20.4[c] | 7-15 | 139 | 7-16 | 196 |
| 8 | C-8 | 0.78 | 200 | 23.2[c] | 15-39 | 243 | 14-36 | 270 |
| 9 | C-9 | 0.91 | 200 | 23.4[c] | 15-38 | 237 | 14-36 | 263 |
| 10 | C-10 | 2.2 | 519 | 24.9[c] | 12-17 | 163 | 11-16 | 217 |
| 11 | C-11 | 0.99 | 415 | 26.7[c] | 25-56 | 273 | 25-57 | 415 |
| 12 | C-12 | 0.78 | 218 | 23.3[c] | 15-41 | 250 | 15-40 | 278 |

TABLE VII-continued

| Run No. | NaAl Silicate[a] | Ave. Particle Size, microns | BET Surface Area, m²/g | Wt. loss % | RF Exposure Time | | | |
|---|---|---|---|---|---|---|---|---|
| | | | | | 30 sec. | | 60 sec. | |
| | | | | | ΔmAmp | °F. | ΔmAmp | °F. |
| 13 | C-13 | 0.83 | 274 | 23.5[c] | 18–47 | 260 | 18–47 | 295 |

[a]Samples designated A- are amorphous while those showing C- are crystalline.
[b]Moisture loss.
[c]Loss on ignition.

The results shown in Table VII demonstrate that for the amorphous or crystalline sodium aluminum silicates a significant improvement in RF sensitizing efficiency is seen in using those materials which have high surface area and small particle size. It is also expected that the RF sensitizer materials of smaller particle size will have less effect on polymer physical properties than similar materials of larger particle size.

I claim:

1. A composition comprising ultra-high molecular weight polyethylene suitable for enhancement of radio frequency sensitivity and a radio frequency sensitizing amount of a crystalline or amorphous alkali or alkaline earth metal aluminosilicate treated essentially to remove absorbed water and/or other volatiles.

2. A composition of claim 1 wherein said inorganic radio frequency sensitizer is amorphous alkali or alkaline earth metal aluminosilicate.

3. A composition of claim 2 wherein said sensitizer has been heat treated.

4. A composition of claim 3 wherein said sensitizer is present in an amount in a range of about 1 weight percent to about 20 weight percent based on total composition.

5. A composition of claim 1 wherein said radio frequency sensitizer is crystalline alkali or alkaline earth metal aluminosilicate.

6. A compositon of claim 5 wherein said sensitizer has been heat treated.

7. A composition of claim 6 wherein said sensitizer is present in an amount in a range of about 1 weight percent to about 20 weight percent based on total composition.

8. A composition of claim 5 wherein said crystalline alkali or alkaline earth metal aluminosilicate is a zeolite.

9. A composition of claim 8 wherein said sensitizer has been heat treated.

10. A composition of claim 9 wherein said sensitizer is present in an amount in a range of about 1 weight percent to about 20 weight percent based on total composition.

11. A method for enhancing the radio frequency sensitivity of a substance suitable for radio frequency enhancement comprising admixing with said substance suitable for radio frequency enhancement a radio frequency sensitizing amount of a crystalline or amorphous alkali or alkaline earth metal aluminosilicate treated essentially to remove absorbed water and/or other volatiles.

12. A method of claim 11 wherein said radio frequency sensitizer is amorphous alkali or alkaline earth metal aluminosilicate.

13. A method of claim 12 wherein said substance suitable for enhancement of radio frequency sensitivity is a polymer.

14. A method of claim 13 wherein said polymer is ultra high molecular weight polyethylene.

15. A method of claim 14 wherein said sensitizer has been heat treated.

16. A method of claim 15 wherein said sensitizer is admixed in an amount in a range of about 1 weight percent to about 20 weight percent based on total composition.

17. A method of claim 11 wherein said radio frequency sensitizer is crystalline alkali or alkaline earth metal aluminosilicate.

18. A method of claim 17 wherein said substance suitable for enhancement of radio frequency sensitivity is a polymer.

19. A method of claim 18 wherein said polymer is ultra high molecular weight polyethylene.

20. A method of claim 19 wherein said sensitizer has been heat treated.

21. A method of claim 20 wherein said sensitizer is admixed in an amount in a range of about 1 weight percent to about 20 weight percent based on total composition.

22. A method of claim 17 wherein said crystalline alkali or alkaline earth metal aluminosilicate is a zeolite.

23. A method of claim 22 wherein said substance suitable for enhancement of radio frequency sensitivity is a polymer.

24. A method of claim 23 wherein said polymer is ultra high molecular weight polyethylene.

25. A method of claim 24 wherein said sensitizer has been heat treated.

26. A method of claim 25 wherein said sensitizer is admixed in an amount in a range of about 1 weight percent to about 20 weight percent based on total composition.

* * * * *